United States Patent
Kojima et al.

(10) Patent No.: US 7,280,151 B2
(45) Date of Patent: Oct. 9, 2007

(54) VIDEO CAMERA WITH A ROTATABLE GRIP UNIT

(75) Inventors: Akira Kojima, Kunitachi (JP); Yuichiro Kota, Tokyo (JP); Minoru Ikeda, Inagi (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 10/785,052

(22) Filed: Feb. 25, 2004

(65) Prior Publication Data

US 2005/0062880 A1  Mar. 24, 2005

(30) Foreign Application Priority Data

Sep. 19, 2003 (JP) ............................ 2003-328541

(51) Int. Cl.
*H04N 5/225* (2006.01)
(52) U.S. Cl. .................... 348/373; 348/14.07; 348/52; 348/133; 348/739; 396/423; 396/424; 396/425; 396/373
(58) Field of Classification Search ................ 348/373, 348/14.07, 52, 87, 126, 133, 333.01, 333.02, 348/739, 375, 333.06; 396/423, 424, 425, 396/373, 376
See application file for complete search history.

(56) References Cited

U.S. PATENT DOCUMENTS

| | | | | |
|---|---|---|---|---|
| 4,959,729 A | * | 9/1990 | Fukuda et al. ............... | 348/375 |
| 4,963,987 A | * | 10/1990 | Ichiyoshi et al. ........... | 348/375 |
| 5,303,062 A | * | 4/1994 | Kawarai et al. ............. | 386/118 |
| 5,442,453 A | * | 8/1995 | Takagi et al. ................. | 386/118 |
| 5,548,334 A | * | 8/1996 | Ichiyoshi .................. | 348/341 |
| 5,946,512 A | * | 8/1999 | Lavine et al. ................ | 396/423 |
| 5,949,504 A | * | 9/1999 | Kim ............................ | 349/59 |
| 6,215,524 B1 | * | 4/2001 | Shiozaki ..................... | 348/376 |
| 6,226,448 B1 | * | 5/2001 | Takagi et al. ............... | 386/118 |
| 6,295,088 B1 | * | 9/2001 | Tsukahara et al. ..... | 348/333.06 |

(Continued)

FOREIGN PATENT DOCUMENTS

JP  8-149354  11/1994

(Continued)

*Primary Examiner*—David Ometz
*Assistant Examiner*—Usman Khan
(74) *Attorney, Agent, or Firm*—Reed Smith LLP; Stanley P. Fisher, Esq.; Juan Carlos A. Marquez, Esq.

(57) ABSTRACT

A video camera is disclosed which can make photographing without any compulsion. A rotary grip is provided on a side face of a camera body so as to be rotatable relative to the camera body, the camera body having an image pickup device, a camera lens and a circuit board of various circuits. A hand strap is attached to the rotary grip. For carrying the video camera, the fingers other than the thumb of one hand are inserted between the rotary grip and the hand strap so that the tips thereof are caught on a peripheral surface of the rotary grip. A liquid crystal display monitor and an operating unit are integral with the peripheral surface of the rotary grip, and when the rotary grip is rotated relative to the camera body unit, the hand strap, as well as the liquid crystal display monitor and the operating unit, also rotate. Thus, the direction of the liquid crystal display monitor and that of the operating unit can be changed with respect to a photographing direction, and it is also possible to change the way of carrying the video camera.

6 Claims, 8 Drawing Sheets

U.S. PATENT DOCUMENTS

| | | | |
|---|---|---|---|
| 6,573,939 B1 * | 6/2003 | Yokoyama | 348/375 |
| 6,643,459 B2 * | 11/2003 | Ota | 396/84 |
| 6,683,653 B1 * | 1/2004 | Miyake et al. | 348/373 |
| 6,942,400 B2 * | 9/2005 | Shibayama | 396/419 |
| 6,972,925 B2 * | 12/2005 | Tsuchida | 360/85 |
| 2006/0050151 A1 * | 3/2006 | Fujinawa | 348/207.99 |
| 2006/0210263 A1 * | 9/2006 | Oh | 396/287 |

FOREIGN PATENT DOCUMENTS

| | | |
|---|---|---|
| JP | 8-116476 | 5/1995 |
| JP | 2001-111877 | 10/1999 |

* cited by examiner

VIDEO CAMERA WITH A ROTATABLE GRIP UNIT

FIELD OF THE INVENTION

The present invention relates to a portable video camera.

BACKGROUND OF THE INVENTION

As a portable video camera there has been proposed one provided with a disc deck. For example, a video camera provided with a disc deck is described in Japanese Patent Laid-Open No. 2001-111877.

The portable video camera provided with a disc deck has a construction wherein a housing of a disc deck unit is integral with a side face of a camera unit, the camera unit containing an image pickup unit such as a CCD as an image pick-up device and a circuit board of various circuits. A hand strap is provided on a side face of the disc deck unit, and by grasping the disc deck unit with a hand, it is possible to carry the video camera with one hand. An upper surface of the disc deck unit projects to a greater extent than an upper surface of the camera unit so that fingertips which grasp the disc deck unit are caught on a side of the upper surface of the disc deck unit which side is located on the camera unit side. With this structure, the disc deck unit is made easy to grasp, that is, the video camera is made easy to carry.

On the front side of the camera unit is provided a camera lens unit, while on the rear side thereof is provided a liquid crystal display monitor using a liquid crystal.

In an opposite side face of the camera unit there is formed a receptacle unit for receiving a liquid crystal display monitor unit therein. The liquid crystal display monitor unit is rotatable so that it can open and close the said receptacle unit. Further, the liquid crystal display monitor unit is rotatable about a second rotary shaft perpendicular to a rotary shaft which is for opening and closing the receptacle unit, thereby changing vertically and transversely the direction in which a liquid crystal screen provided in the liquid crystal display monitor unit faces. In the liquid crystal display monitor unit, there are provided not only the same photographed display as in the above liquid crystal display monitor but also reproduction display and menu display in the disc deck unit.

On the back side of the camera unit and that of the disc deck unit there are disposed various operating buttons so as to be operated with the thumb of the hand which carries the video camera.

In the video camera disclosed in the above Japanese Patent Laid-Open No. 2001-111877, the liquid crystal display monitor is disposed on the back side of the camera unit, so when photographing is to be made using this liquid crystal display monitor, it is necessary to put the liquid crystal display monitor in the same position as the position of the photographer's eye. Therefore, the posture of the photographer who carries the video camera is determined to a certain posture unambiguously. When the photographer intends to photograph a place higher than his or her height, the photographer bends his or her neck or body while keeping his or her video camera-carrying posture intact. If such a photographing is performed for a long time, the photographer is compelled to take an unnatural posture over a long time.

Even if the photographer makes photographing in a natural stand-up state while looking at the liquid crystal display monitor, an easy way of carrying the video camera differs depending on the photographer and therefore, in the case where there is only one way of carrying the video camera, it follows that such one way is an unnatural way for certain photographers.

SUMMARY OF THE INVENTION

It is an object of the present invention to solve the above-mentioned problems and provide a video camera which permits photographing to be performed without compulsion.

According to the present invention, for achieving the above-mentioned object, there is provided a video camera comprising a camera body unit which contains an image pickup unit and a circuit board of various circuits, a rotary grip provided on one side face of the camera body unit so as to be rotatable relative to the camera body unit, a liquid crystal display monitor integral with a peripheral surface of the rotary grip, and an operating unit integral with the peripheral unit of the rotary grip.

For achieving the above-mentioned object, the present invention is constructed so as to comprise a camera body unit having at least an image pickup unit and a circuit board, a grip unit having at least a disc drive mechanism, and a rotating unit which connects the grip unit rotatably to one side face of the camera body unit so as to be parallel to an optical axis of a camera lens, the disc drive mechanism having a medium receptacle portion in parallel with the circuit board.

According to the construction of the present invention, since the grip unit (rotary grip) is connected rotatably through the rotating unit to the camera body unit having a camera lens in such a manner that the grip unit is parallel to the optical axis of the camera lens, a photographer of the video camera can grasp the rotary grip unit in such a manner as is easy for him or her to grasp while directing the camera lens to an object no matter in which direction the object may be present. Besides, the photographer can direct the camera lens in any direction while looking at the screen of the liquid crystal display monitor in the same posture. The photographer can make photographing in a posture free of compulsion. Thus, the easiness of use is greatly improved.

DETAILED DESCRIPTION OF A PREFERRED EMBODIMENT

An embodiment of the present invention will be described herein under with reference to the accompanying drawings.

Figure 1:
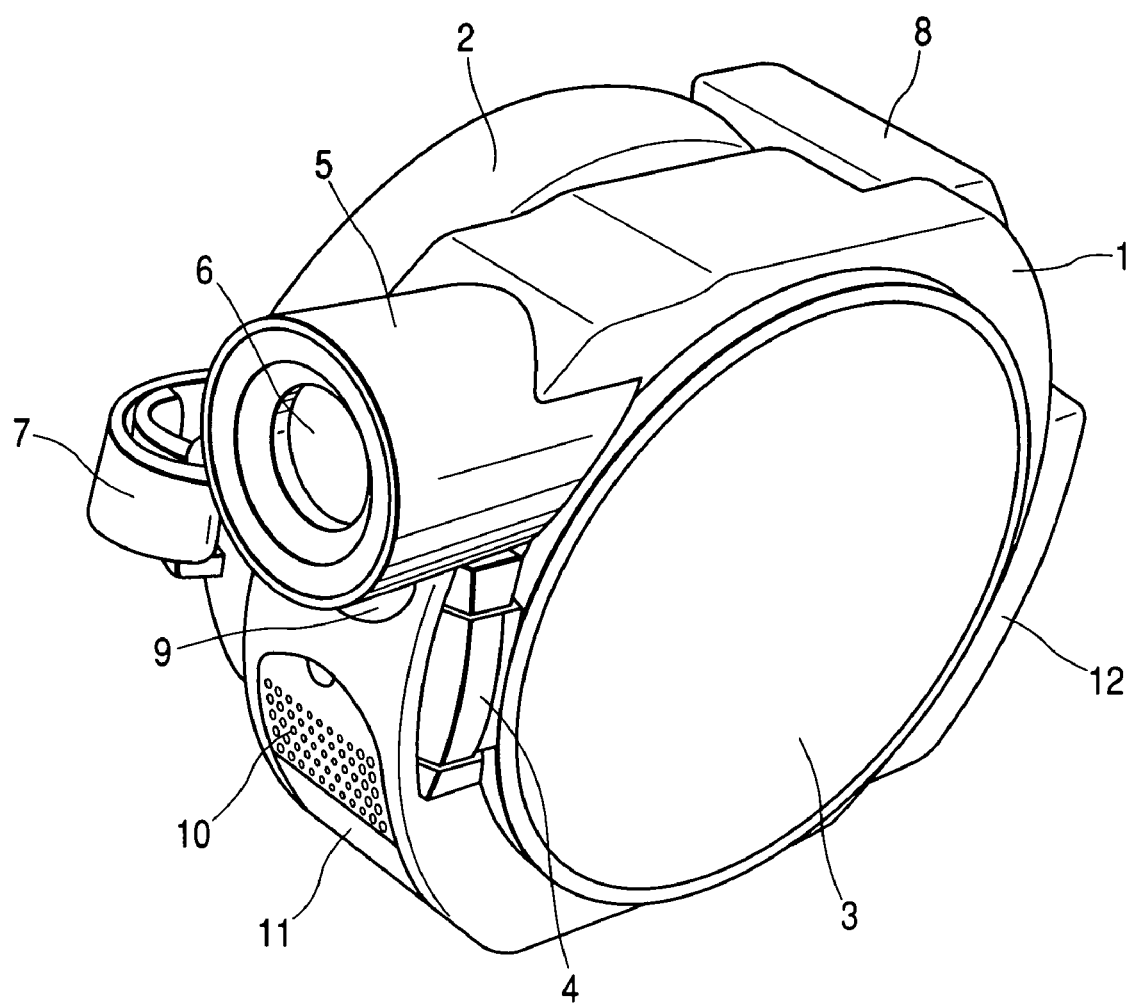
FIG. 1 is a perspective view of a video camera according to an embodiment of the present invention as seen from a front side.
Figure 2:
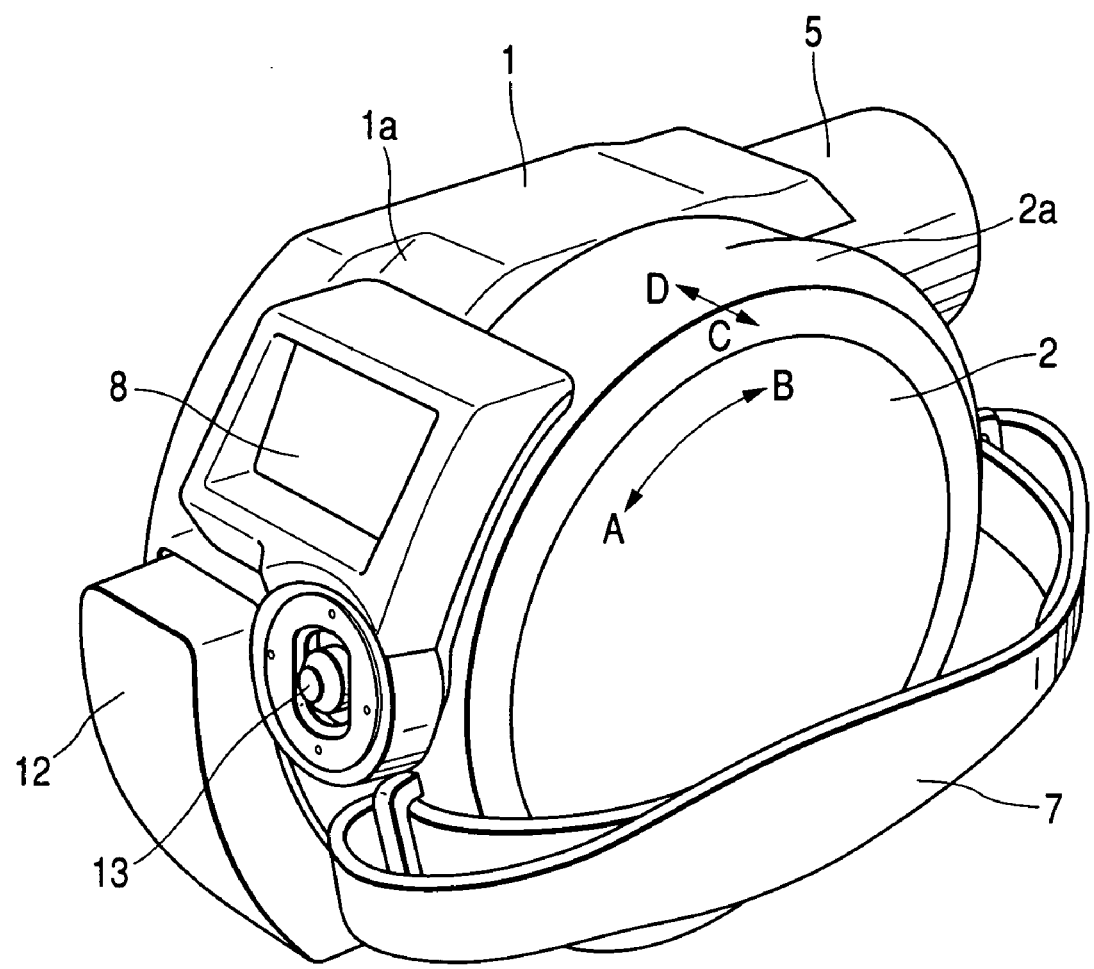
FIG. 2 is a perspective view of the video camera shown in FIG. 1 as seen from a back side.

FIG. 1 is a perspective view of a video camera according to an embodiment of the present invention as seen from a front side and FIG. 2 is a perspective view thereof as seen from a back side. In the same figures, the numeral 1 denotes a first housing, numeral 1a denotes a slide surface, numeral 2 denotes a second housing (grip unit), numeral 2a denotes a case portion, 3 denotes a liquid crystal display monitor unit, 4 denotes a hinge, 5 denotes a lens barrel, 6 denotes a camera lens, 7 denotes a hand strap, 8 denotes a liquid crystal display monitor, 9 denotes a remote-controlled light receiving unit, 10 denotes a microphone, 11 denotes an opening/closing lid, 12 denotes a battery, 13 denotes an operating unit, and 14 denotes a recording medium insertion aperture.

In this embodiment, the following description is now provided, assuming that the first housing 1 is a camera body unit, the second housing 2 (grip unit) is a rotary grip, the liquid crystal display monitor 8 is a sub-liquid crystal display monitor, and the recording medium insertion aperture 14 is a disc insertion aperture.

In FIG. 1, a camera body unit 1 contains an image pick-up unit which includes a diaphragm and a CCD disposed on an optical axis of a camera lens, and various signal processing units which include a CPU and a memory. The camera body unit 1 has an appearance of a flat, cylindrical shape provided with upper and lower flat units. A rotary grip 2 is formed on one side face of the camera body unit 1 and a liquid crystal display monitor unit 3 is formed on an opposite side face of the camera body. A lens barrel 5 which contains a camera lens 6, etc. projects from a front side of the camera body unit 1. Further, a remote-controlled light receiving unit 9, a microphone 10, and an opening/closing lid 11 are disposed below the lens barrel 5. When the opening/closing lid 11 is opened, external input/output terminals and PC connecting terminals (not shown) etc. which are provided inside can be seen.

The liquid crystal display monitor unit 3 is a disc-like structure attached to the camera body unit 1 so as to be capable of being opened and closed through a hinge 4 which is provided on the front side of a side face of the camera body unit 1. In FIG. 1, the liquid crystal display monitor unit 3 is in a closed state in which it is fitted in a receptacle unit (not shown) formed in a side face of the camera body unit 1. Inside the liquid crystal display monitor unit 3 is disposed a main liquid crystal display monitor (not shown).

Next, in FIG. 2, the rotary grip 2 is in a flat, cylindrical shape and is provided on one side face of the camera body unit 1 so as to be parallel in its diametrical direction to an optical axis of the camera lens 6. The rotary grip 2 is attached to the camera body unit 1 so as to be rotatable in arrow A and B directions through a rotary mechanism which includes a central shaft 15 (see FIG. 3). The rotary grip 2 is a unit to be gripped by the palm of the photographer's hand when this video camera is used. For stabilizing this gripping, a hand strap 7 is secured to the rotary grip 2 so as to span approximately a half of the side face of the rotary grip 2 from the rear to the front side of the rotary grip.

On a peripheral surface of the rotary grip 2, a sub-liquid crystal display monitor 8 is disposed on the rear side and an operating unit 13 is disposed below the sub-liquid crystal display monitor 8, both sub-liquid crystal display monitor 8 and operating unit 13 being integral with the rotary grip 2. The sub-liquid crystal display monitor 8 is formed in a width larger than the width of the peripheral surface of the rotary grip 2. A slide surface 1a of the sub-liquid crystal display monitor 8 is formed on a peripheral surface of the camera body unit 1 so that, when the rotary grip 2 is rotated relative to the camera body unit 1, the sub-liquid crystal display monitor 8 can move smoothly with the rotating motion of the rotary grip. The sub-liquid crystal display monitor 8 can be used as a finder in which an image being photographed is displayed. It is also possible to let a menu display be provided therein.

The rotary grip 2 is provided with a case portion 2a so as to cover a part of the peripheral surface of the rotary grip and a side face of the same grip. The case portion 2a is disposed in proximity to a side face of the camera body unit 1 so as to be parallel to the optical axis of the camera lens 6 and can be moved in arrow C and D directions (parallel to the rotating unit) relative to the body of the rotary grip 2. In FIG. 2 there is illustrated a state in which the case portion 2a has been pushed (slid) in the direction of arrow D. There may be used a lock mechanism (not shown) for locking the case portion 2a when pushed in the arrow D direction.

Figure 6:
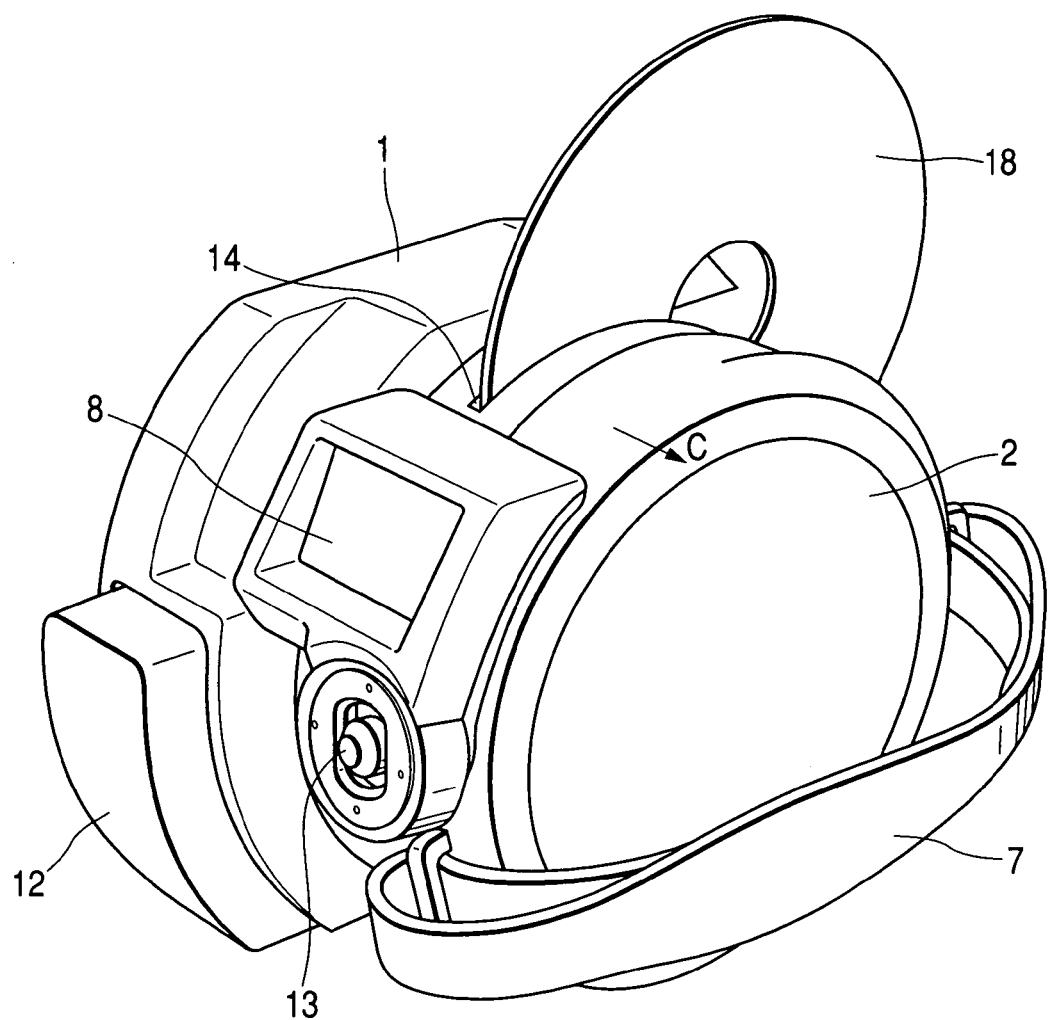
FIG. 6 is a perspective view showing in what state a disc is inserted and removed through a disc insertion aperture formed in the rotary grip of the video camera shown in FIG. 1.

In the rotary grip 2 is accommodated a disc drive mechanism which performs read and write of information from and to a recording medium, e.g., an optical disc such as DVD. The disc drive mechanism is provided with a medium receptacle portion 2A (see FIG. 3) for receiving therein a recording medium inserted through a disc insertion aperture 14. The medium receptacle portion 2A is formed so as to be parallel to a circuit board 19 (see FIG. 3) which is provided in the camera body unit 1. The disc insertion aperture 14 (see FIG. 6), which permits entry and removal of an optical disc (not shown), is formed in the peripheral surface of the rotary grip 2. The disc insertion aperture 14 is normally closed with the case portion 2a, but is opened (exposed) when the case portion 2a is pulled and moved (slid) in the direction of arrow C, thus permitting entry and removal of the disc, as shown in FIG. 6.

On the back side of the camera body unit 1, there is provided a battery 12 contained in a battery receptacle unit. The battery is exchangeable easily by inserting the battery in the battery receptacle unit and taking out it from the battery receptacle unit.

Figure 3:
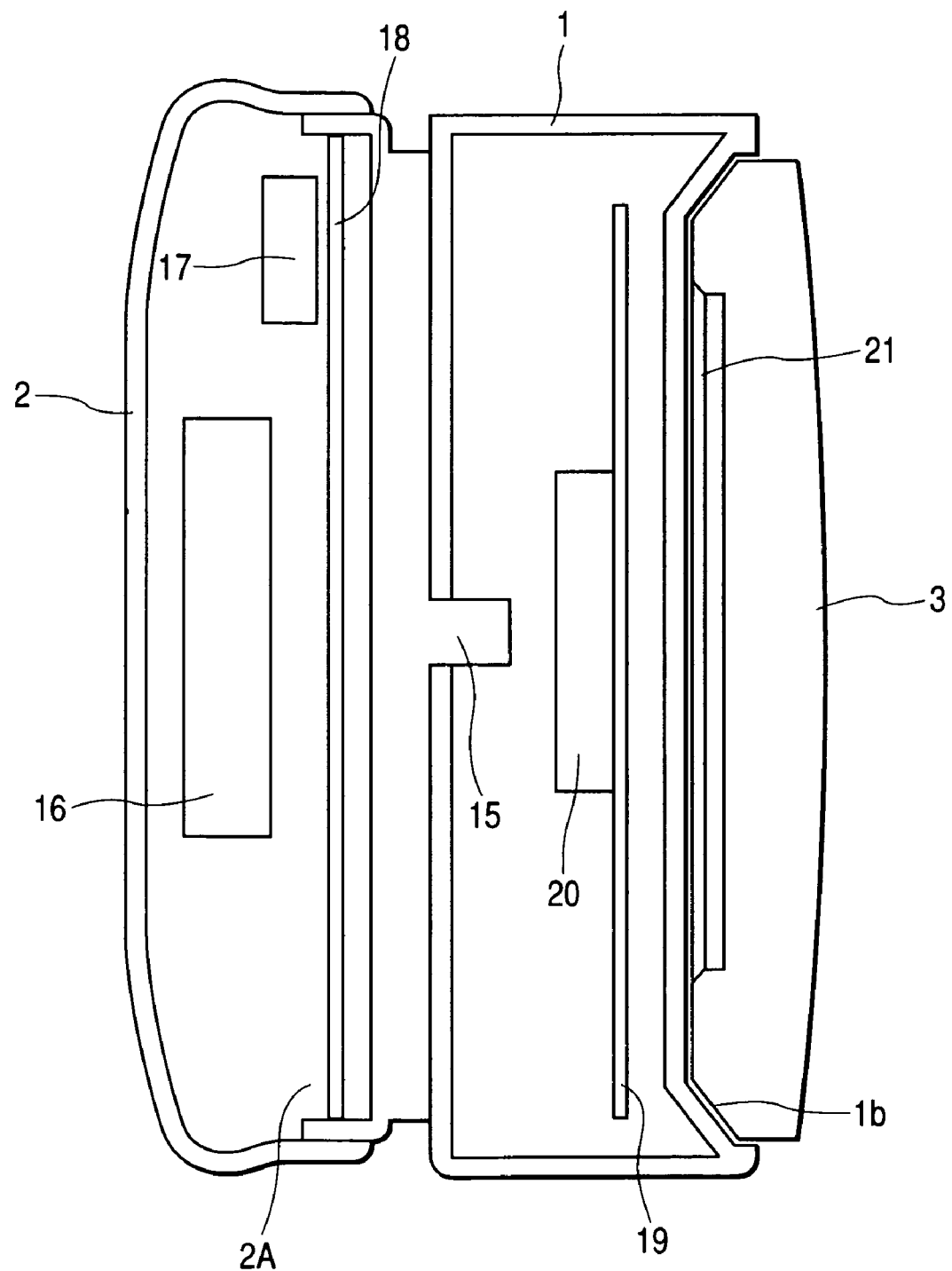
FIG. 3 is a vertical sectional view taken along a plane which is perpendicular to a side face of a camera body unit of the video camera shown in FIG. 1.

FIG. 3 is a vertical sectional view taken along a plane which is perpendicular to a side face of the camera body unit 1 of the video camera shown in FIGS. 1 and 2. FIG. 3 schematically shows internal constructions of the camera body unit 1, the rotary grip 2 in which the disc drive unit is accommodated, and the liquid crystal display monitor unit 3. In FIG. 3, the numeral 15 denotes a rotary shaft, numeral 16 denotes a disc driving motor, 17 a pickup for recording and reproduction, 18 an optical disc, 19 a circuit board, 20 a CPU, and 21 a main liquid crystal display monitor of a touch panel type. In FIG. 3, units common to FIGS. 1 and 2 are identified by the same reference numerals as in FIGS. 1 and 2.

In FIG. 3, the camera body unit 1 and the rotary grip 2 are secured to each other rotatably through a rotating unit, e.g., a rotary shaft 15. A disc 18 is inserted into the rotary grip 2 through the disc insertion aperture 14 (FIG. 2), then is received in the medium receptacle portion and is placed on a table (not shown), then is rotated by means of a disc motor 16, and recording or reproduction is performed through a recording/reproducing pickup 17. A loading mechanism (not shown) for discharging the disc 18 is also provided within the rotary grip 2.

Within the camera body unit 1, there are disposed an image pickup unit (not shown), as well as a circuit board 19 and a CPU 20 for performing various signal processings and controls. A main liquid crystal display monitor 21 is disposed on a surface side of the liquid crystal display monitor unit 3. As noted earlier, when the liquid crystal display monitor unit 3 is closed, the main liquid crystal display monitor 21 is received in a receptacle portion 1b formed in a side face of the camera body unit 1 and is closed with the liquid crystal display monitor unit 3.

Figure 4:
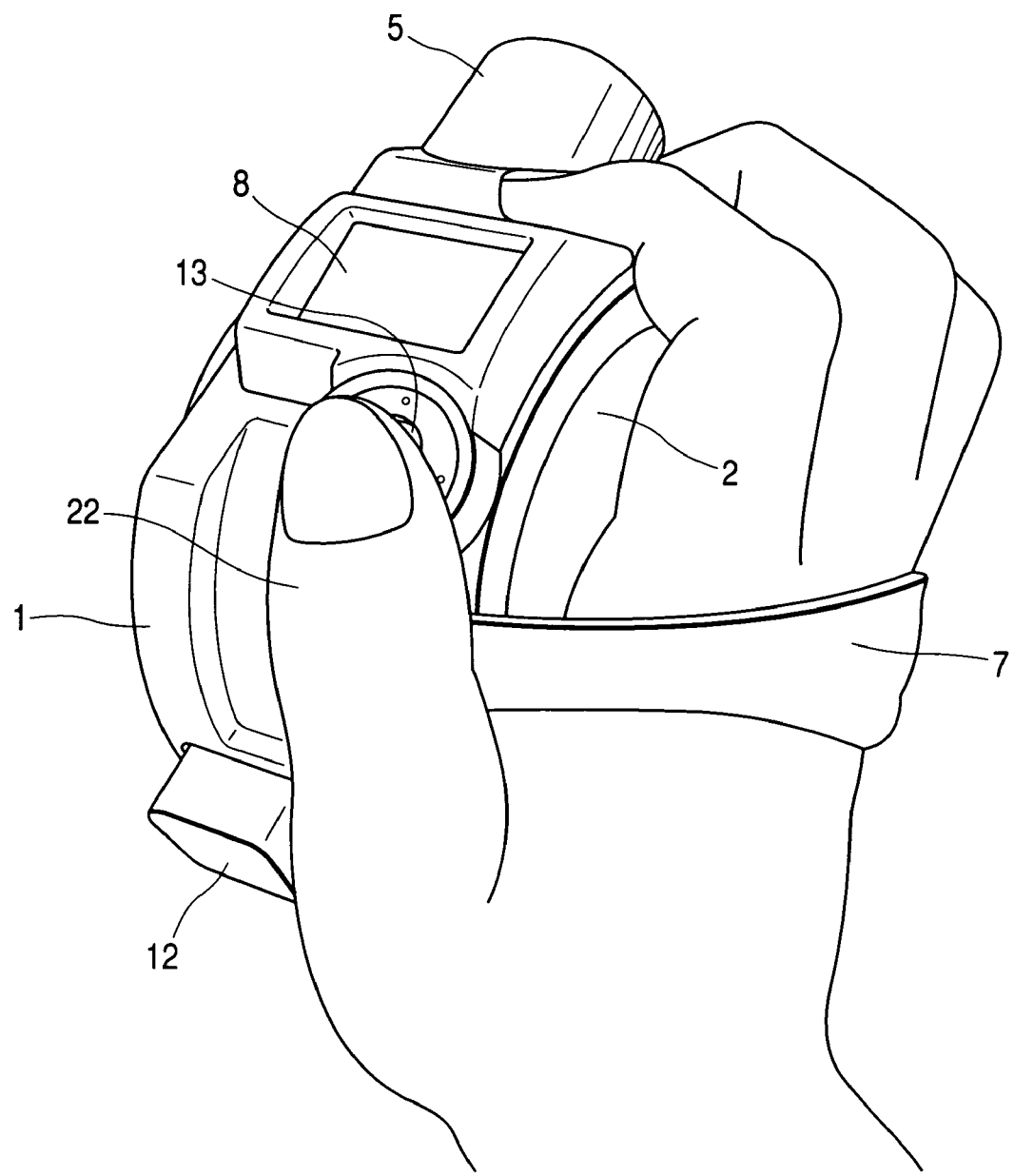
FIG. 4 illustrates in what state the video camera shown in FIG. 1 is used.

For using the video camera of the above construction, as shown in FIG. 4, the other fingers than the thumb of the right hand are passed between the hand strap 7 and the rotary grip 2, whereby it is possible to carry the video camera while grasping the rotary grip 2. At this time, the operating unit 13 can be operated with a thumb 22. Further, by holding the camera body unit 1 with the other hand (the left hand in this example), the rotary grip 2 can be rotated relative to the camera body unit 1. By thus rotating the rotary grip 2, the sub-liquid crystal display monitor 8 can be set at an easy-to-see position in a photographing state, and it is also possible to set the operating unit 13 at an easy-to-operate position.

An on-off switch for a power supply of the video camera may be provided in the operating unit 13. In a rotational state of the rotary grip 2 in which the sub-liquid crystal display monitor 8 and the operating unit 13 lie on the rearmost side (in a completely rotated state in the arrow A direction in FIG. 2; this state will hereinafter be referred to as the initial state), the power supply of the video camera may be turned OFF, and when the rotary grip 2 is rotated at a predetermined angle in the arrow B direction (FIG. 2) from the initial state, the power supply of the video camera may be turned ON.

Figure 5A:
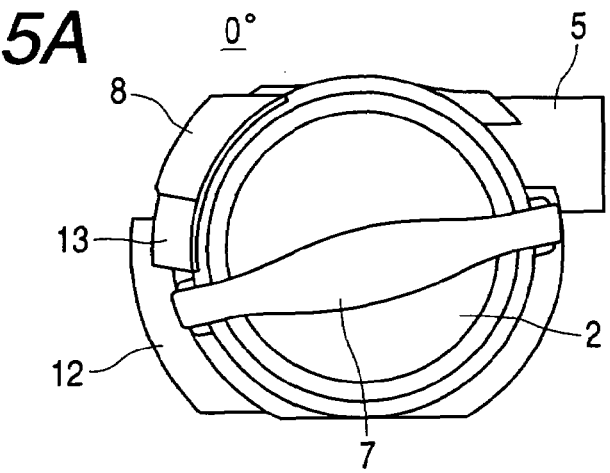
FIGS. 5A, 5B, and 5C illustrate in what state a rotary grip is rotated relative to the camera body unit of the video camera shown in FIG. 1.
Figure 5B:
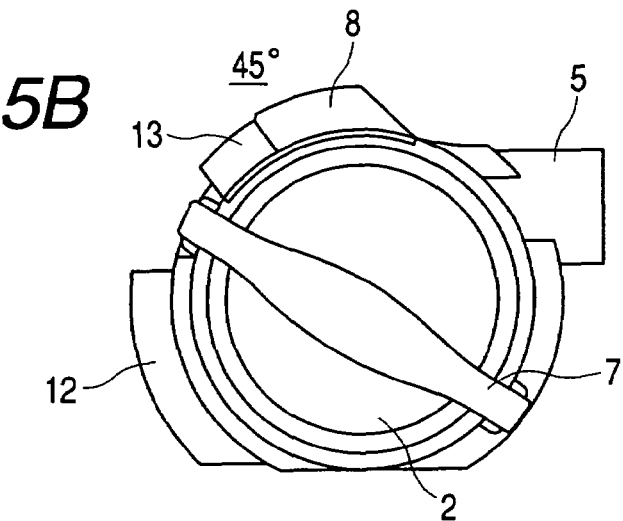
Figure 5C:
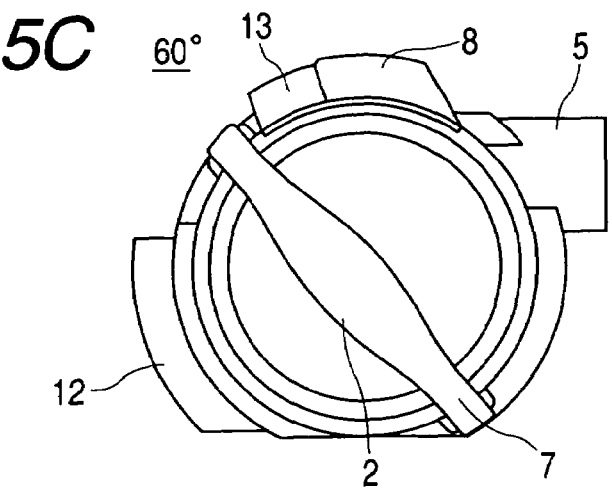

FIGS. 5A, 5B, and 5C illustrate rotational states of the rotary grip 2 relative to the camera body unit 1. In FIGS. 5A, 5B, and 5C, the same units as in the previous drawings are identified by the same reference numerals as in the previous drawings, and tautological explanations will be omitted.

FIG. 5A illustrates the initial state (rotational angle=0°). In this state, the screen of the sub-liquid crystal display monitor 8 faces substantially in the horizontal direction. In the above construction wherein the power supply of the video camera is turned ON by turning the rotary grip 2 at a predetermined angle, the power supply is turned ON or OFF by turning the rotary grip 2 in a small angular range (e.g., 5° to 10°) from the initial state. With the power supply ON, an image being photographed can be monitored by moving the camera so that the liquid crystal display monitor 8 lies at the height of the photographer's eye.

FIG. 5B illustrates a state in which the rotary grip 2 has been rotated by an angle of 45° from the initial state relative to the camera body unit 1. In this state, it is possible to photograph an object present in the horizontal direction while looking at the screen of the sub-liquid crystal display monitor 8 at an angle of approximately 45° with the video camera brought down to a lower position than the eye's height.

FIG. 5C illustrates a state in which the rotary grip 2 has been rotated by an angle of 60° from the initial state relative to the camera body unit 1. In this state, it is possible to photograph an object present in the horizontal direction while looking at the screen of the sub-liquid crystal display monitor 8 at an angle of approximately 60° with the video camera brought down to a lower position than the eye's height.

Of course, in the states shown in FIGS. 5B and 5C, by approximating the screen of the sub-liquid crystal display monitor 8 to the eye's height and looking at the screen substantially in the horizontal direction, it is possible to make photographing while looking up the object. That is, according to the construction of this embodiment, the camera body unit 1 and the rotary grip 2 can mutually rotate through the rotary shaft 15. Therefore, in case of photographing an object while looking up the object, the rotary grip 2 is fixed by one hand (the right hand in this example) and at the same time the camera body unit 1 is rotated by the other hand (the left hand in this example), whereby the object can be photographed at various angles while looking at the screen of the sub-liquid crystal display monitor 8 at a certain angle.

The photographer can bring the rotary grip 2 into a rotated state by only a predetermined angle so as to make it easy to grasp the rotary grip 2.

FIG. 6 is a perspective view showing in what state the disc 18 is inserted and removed into and from the disc insertion aperture 14 formed in the rotary grip 2. In FIG. 6, the same units as in the previous drawings are identified by the same reference numerals as in the previous drawings, and tautological explanations thereof will be omitted.

In the same figure, for inserting the disc 18 into the rotary grip 2 from the disc insertion aperture 14, the case portion 2a of the rotary grip 2 is pulled in its state shown in FIG. 2 and is allowed to slide in the direction of arrow C, thereby allowing the disc insertion aperture 14 formed in the peripheral surface of the rotary grip 2 to be exposed. In this state, the disc 18 can be inserted into the rotary grip 2 from the disc insertion aperture 14. The disc 18 thus inserted into the rotary grip 2 is loaded to the disc drive unit to permit recording and reproduction of information.

For taking out the disc 18 from the disc drive unit, the loading mechanism disposed within the rotary disc 2 operates and a part of the disc 18 is discharged from the disc insertion aperture 14, whereby it is possible to pick out the disc 18. Thereafter, the case portion 2a is made to slide in the direction of arrow D, whereby the disc insertion aperture 14 is covered and shielded with the case portion 2a.

The operating unit 13 shown in FIG. 2 is constructed such that when the liquid crystal display monitor unit 3 (FIG. 1) is closed, an operating function for the sub-liquid crystal display monitor 8 is set, while when the liquid crystal display monitor unit 3 is open, an operating function for the liquid crystal display monitor 21 (FIG. 3) disposed in the liquid crystal display monitor unit 3 is set.

Figure 7:
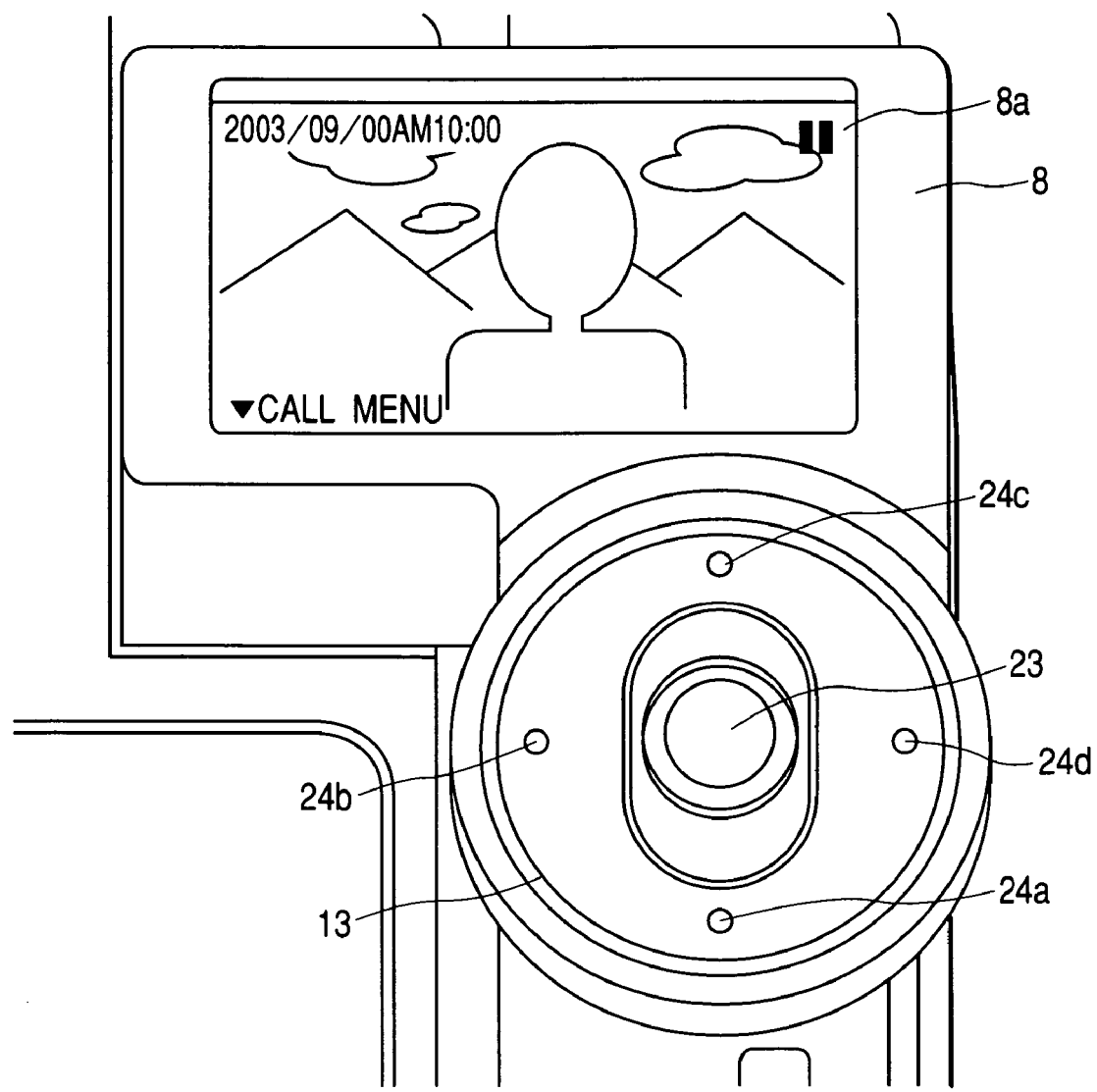
FIG. 7 is a diagram for explaining the construction of an operating unit shown in FIG. 2 and the function of the operating unit in a closed condition of a liquid crystal display monitor unit.

FIG. 7 is a diagram for explaining the construction of the operating unit 13 and the function of the operating unit 13 in a closed state of the liquid crystal display monitor unit 3. In the same figure, numeral 8a denotes a display screen, numeral 23 denotes a joy stick, and numerals 24a to 24d denote cross buttons. The same units as in the previous drawings are identified by the same reference numerals as in the previous drawings.

In the same figure, the operating unit 13 is composed of a joy stick 23 capable of being operated vertically and depressed and four cross buttons 24a to 24d which are arranged crosswise with respect to the joy stick 23. On a display screen 8a of the sub-liquid crystal display monitor 8, a photographing display and a menu display can be provided by operation of the operating unit 13. In the illustrated example, the menu display is superimposed on the photographing display.

When the power supply of the video camera is turned ON, an image being photographed is displayed on the display screen 8a of the sub-liquid crystal display monitor 8. In this state, if the joy stick 23 is operated vertically, there is performed zooming, while if the joy stick 23 is depressed, there is performed start or stop of picture recording in the disc drive unit disposed within the rotary disc 2. Further, if a predetermined cross button (the cross button 24a in this example) out of the cross buttons 24a to 24d is operated, a menu display is provided on the display screen 8a in a superimposed state on the photographing display. As to the menu display, a concrete explanation thereof will be given later. By operating the cross buttons 24a to 24d when the menu display is provided, it is possible to select a menu item on the menu display, and by depressing the joy stick 23 it is possible to determine the selected menu item and a shift is made to the display of the menu item thus determined. By operating the joy stick 23 vertically it is also possible to select any of menu items arranged vertically. Thus, the selection of a menu item in the horizontal direction may be performed using the cross buttons 24b and 24d and the selection of a menu item in the vertical direction may be performed using the joy stick 23.

Figure 8:
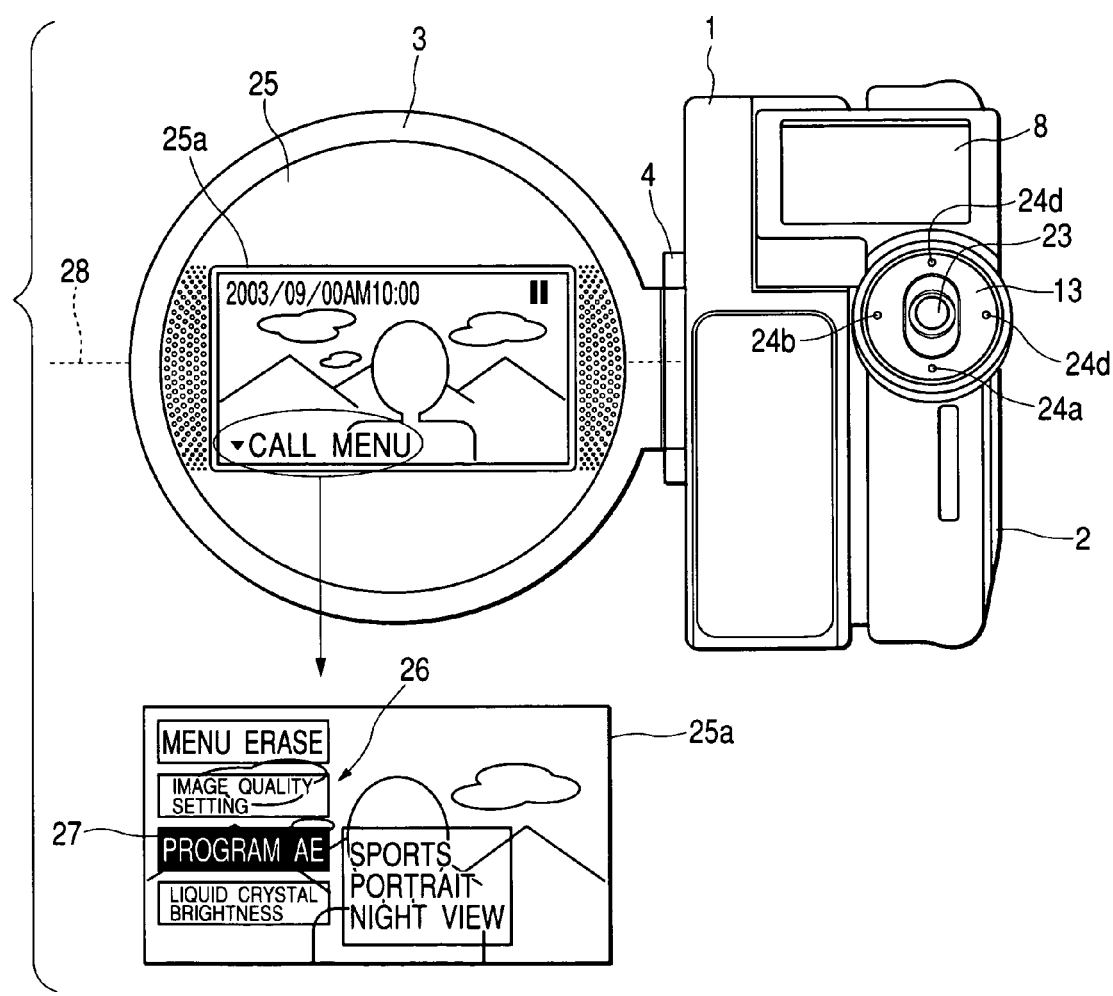
FIG. 8 is a diagram for explaining the function of the operating unit in FIG. 2 in an open condition of the liquid crystal display monitor unit.

FIG. 8 is a diagram for explaining the function of the operating unit 13 in an open condition of the liquid crystal display monitor unit 3, in which numeral 25 denotes a main liquid crystal display monitor, numeral 25a denotes a display screen thereof, and numeral 26 denotes a menu display, and the same units as in FIG. 7 are identified by the same reference numerals as in FIG. 7.

In FIG. 8, when the liquid crystal display monitor unit 3 is opened, an image being photographed is displayed on the display screen 25a of the main liquid crystal display monitor 25. The operating unit 13 functions for the display screen 25a. At this time, the power supply of the sub-liquid crystal display monitor 8 is turned OFF for the reduction of power consumption.

In this case, the function of the operating unit 13 for the main liquid crystal display monitor is the same as the function for the sub-liquid crystal display monitor 8 explained above in connection with FIG. 7. That is, if the joy stick 23 is operated vertically while a photographing display is provided, there is performed zooming, and if the joy stick 23 is depressed, there is performed start or stop of picture recording in the disc drive unit disposed within the rotary grip 2. Further, if the cross button 24a is operated, a menu display 26 is provided on the display screen 25a in a superimposed state on the photographing display. The menu display includes menu items such as, for example, "MENU ERASE", "IMAGE QUALITY SETTING", "PROGRAM AE", "LIQUID CRYSTAL BRIGHTNESS", "SPORTS", "PORTRAIT", and "NIGHT VIEW". A cursor 27 adapted to turn over black and white is applied to a selected menu item.

By operating the cross buttons 24a to 24d while the menu display 26 is provided, the cursor 26 moves vertically and transversely on the menu display, thus permitting selection of any of the menu items. Then, by depressing the joy stick 23 it is possible to determine the menu item selected (i.e., with the cursor 27 applied thereto), and a shift is made to the display of the menu item thus determined. By operating the joy stick 23 vertically it is also possible to select any of menu items arranged vertically. For example, if the menu item "PORTRAIT" is to be selected in the state in which menu items are arranged as illustrated in the figure and the cursor 27 selects the menu item "PROGRAM AE", the cursor 27 is moved to the column which begins with the menu item "SPORTS" by operating the cross button 24d and thereafter the joy stick 23 is operated to let the cursor 27 move vertically to the desired menu item "PORTRAIT".

Further, since the main liquid crystal display monitor 25 possesses a touch panel function, by touching the menu display 26, the touched menu item is selected and determined, and thus a desired menu item can be selected and determined easily and accurately.

In FIG. 8, the main liquid crystal display monitor 25 faces the back side of the video camera, but the liquid crystal display monitor unit 3 can be rotated about a shaft 28 which is parallel to the display screen 25a and it is possible to set the direction of the display screen 25a arbitrarily. Consequently, the main liquid crystal display monitor 25 can be seen also from the object side, so it is also possible to photograph the photographer him- or herself while monitoring an image thereof. Even with the liquid crystal display monitor unit 3 closed, it is possible to see the main liquid crystal display monitor 25. However, in the case where the direction of the display screen 25a is changed around the shaft 28, an image displayed on the display screen 25a is turned upside down to let an erect image be seen.

On the back side (i.e., the side where the main liquid crystal display monitor 25 is not provided) of the liquid crystal display monitor unit 3 there may be provided a transparent cover for holding a photograph or sheet therein. With this, for example if an object is an infant, it is possible to make photographing while attracting the infant's attention to the photograph or sheet held in the transparent cover.

What is claimed is:

1. A video camera comprising:
  a camera body unit having at least an image pickup unit and a circuit board;
  a grip unit having at least a disc drive mechanism; and
  a rotary mechanism which connects the grip unit rotatably to one side face of the camera body unit,
  wherein the rotary mechanism connects the grip unit to the camera body unit in such a manner that a diametrical direction of the grip unit is parallel to an optical axis of a camera lens, and the disc drive mechanism has a medium receptacle portion provided in parallel with the circuit board,
  wherein the grip unit comprises a medium insertion aperture for insertion of a recording medium into the medium receptacle portion and a case unit adapted to expose and shield the medium insertion aperture, the case unit being adapted to slide in a direction parallel to the rotary mechanism.

2. A video camera comprising:
  a camera body unit having at least an image pickup unit and a circuit board;
  a grip unit having at least a disc drive mechanism; and
  a rotary mechanism which connects the grip unit rotatably to one side face of the camera body unit,
  wherein the rotary mechanism connects the grip unit to the camera body unit in such a manner that a diametrical direction of the grip unit is parallel to an optical axis of a camera lens, and the disc drive mechanism has a medium receptacle portion provided in parallel with the circuit board
  wherein a liquid crystal display monitor unit is provided on an opposite side face of the camera body unit in parallel with the optical axis of the camera lens, and the liquid crystal display monitor unit is disposed rotatably through an axis vertical to the optical axis of the camera lens, wherein the grip unit is provided on a peripheral surface thereof with a sub-liquid crystal display monitor, the sub-liquid crystal display monitor being adapted to move with rotation of the grip unit, and wherein the grip unit is provided on the peripheral surface thereof with an operating unit, the operating unit being constructed such that, in an open condition of the liquid crystal display monitor unit, an operating function for the liquid crystal display monitor unit is set, while in a closed condition of the liquid crystal display monitor unit, an operating function for the sub-liquid crystal display monitor is set.

3. A video camera comprising:

a camera body unit containing an image pickup unit and a circuit board of various circuits;

a rotary grip provided on one side face of the camera body unit so as to be rotatable relative to the camera body unit;

a sub-liquid crystal display monitor disposed integrally on a peripheral surface of the rotary grip; and an operating unit disposed integrally on the peripheral surface of the rotary grip, wherein a liquid crystal display monitor unit is provided on an opposite side face of the camera body unit so as to be rotatable in a predetermined angular range from said side face around a vertical shaft parallel to said side face, and wherein, in an abutted state of the liquid crystal display monitor unit against the side face of the camera body unit, a screen display is provided by the liquid crystal display monitor, while in a rotated state of the sub-liquid crystal display monitor unit from its position on the side face of the camera body unit, a screen display is provided by the liquid crystal display monitor unit.

4. The video camera according to claim 3, wherein the rotary grip contains a disc drive.

5. The video camera according to claim 3, wherein a power supply is turned on and off by rotation in a predetermined angular range of the rotary grip.

6. The video camera according to claim 3, wherein the operating unit has an operating member for causing a menu display to be provided in the liquid crystal display monitor or in the sub-liquid crystal display monitor unit and for performing operations on the menu display.

* * * * *